J. A. GERWEN.
ELEVATOR CUP.
APPLICATION FILED OCT. 30, 1918.

1,295,154.

Patented Feb. 25, 1919.

Inventor,
Julius A. Gerwen
James R. Offield,
Atty

UNITED STATES PATENT OFFICE.

JULIUS A. GERWEN, OF MOLINE, ILLINOIS, ASSIGNOR TO MOLINE MILL MANUFACTURING COMPANY, OF MOLINE, ILLINOIS, A CORPORATION OF DELAWARE.

ELEVATOR-CUP.

1,295,154.      Specification of Letters Patent.      Patented Feb. 25, 1919.

Application filed October 30, 1918. Serial No. 260,275.

*To all whom it may concern:*

Be it known that I, JULIUS A. GERWEN, a subject of the Emperor of Germany, and a resident of Moline, in the county of Rock Island and State of Illinois, have invented certain new and useful Improvements in Elevator-Cups, of which the following is a specification.

My invention relates to cups or buckets which are particularly adaptable for use in elevators for conveying granular material such as grain.

In grain and other elevators cups or buckets are secured with their backs against a belt traveling around upper and lower pulleys, the grain being discharged as the cups or buckets travel downwardly around the upper pulley. In prior constructions the bottom of the cup or bucket is usually in one straight plane and at a certain angle with the back of the cup. With this arrangement the cups must be placed a certain distance apart on the belt and pulleys of sufficient diameter must be used and rotated at limited speed, otherwise the cup contents will not be accurately discharged and part of the contents will be thrown against the preceding bucket or into the return leg of the belt chute.

The object of my invention is to so shape the cup or bucket that the pitch or distance apart of the cups can be greatly reduced, the pulley diameter considerably decreased and the speed of rotation increased, and at the same time assuring absolute discharge of the cup contents in a predetermined direction. This I accomplish by providing a multiple surface bottom for the cup, that is, different sections of the bottom are at different angles with the cup back so that as the cup travels around the unloading arc of the pulley the different surfaces will successively give the cup contents the proper discharge direction, the angles of the surfaces being such that all the contents will be discharged in substantially the same direction, in practice toward the discharge outlet of the belt chute.

A cup embodying the features of my invention is shown on the accompanying drawing, in which—

Figure 1:
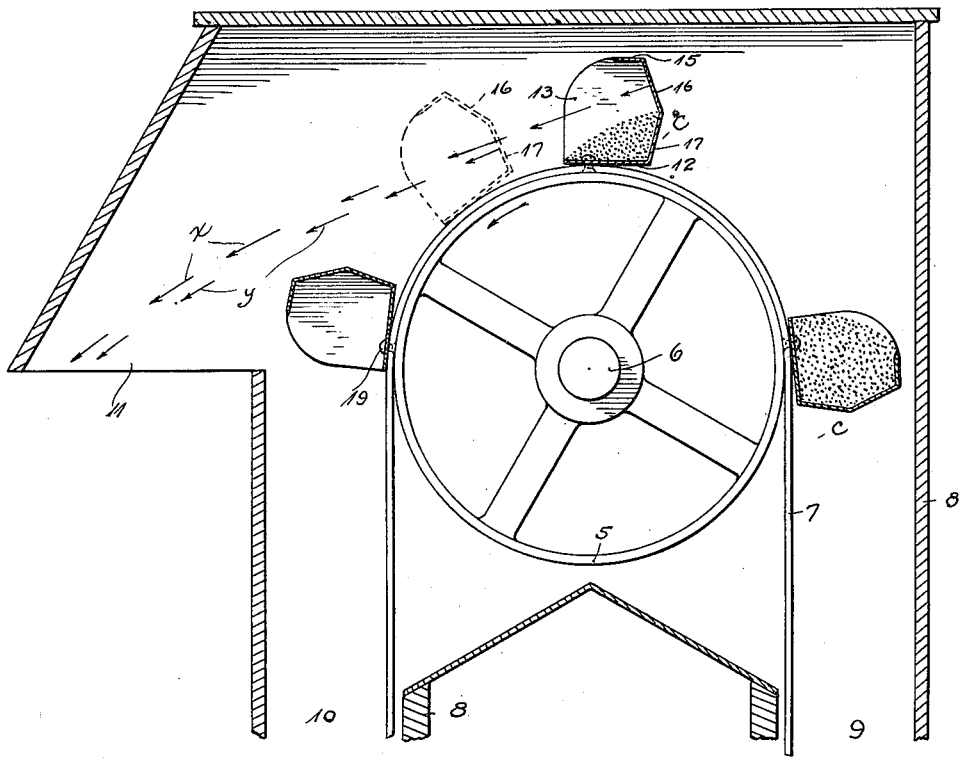
Figure 2:
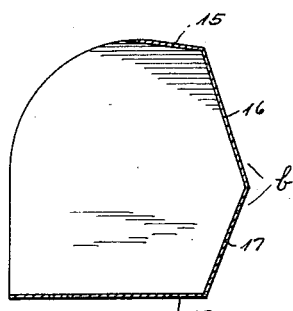
Figure 3:
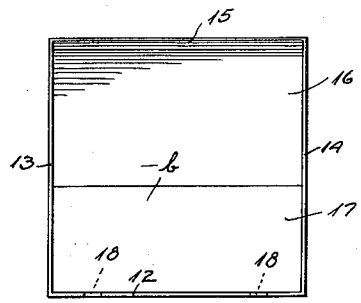

Figure 1 is a side elevational view of the upper end of a conveyer belt with the cups and inclosing housing in vertical section, Fig. 2 is an enlarged transverse section of one of the cups, and Fig. 3 is a plan view of a cup.

In Fig. 1, 5 represents the upper belt pulley mounted on the shaft 6 and 7 represents the belt to which the cups or buckets C are secured. 8 represents the housing of the ordinary construction which has the legs 9 and 10 through which the cups travel, and which at the unloading side has the outlet 11. The cup of my invention may be constructed in any well known manner, preferably of sheet metal, and comprises the back wall 12, the sides 13 and 14, the front wall 15, and the bottom, characterized as a whole by *b*. The bottom shown is of V-shaped cross-section and consists of the outer and inner walls 16 and 17, the outer wall being at an acute angle with the back 12 and the inner wall 17 being at an obtuse angle with the back. The back near its outer edge has the holes 18 by means of which the cup may be secured to the belt by rivets 19, as shown in Fig. 1.

As the cups travel around the pulley through the unloading arc the force of gravity, centrifugal force, and the tangential push of the bucket bottoms and the angle of the bottom determine the direction in which the contents are discharged. With the shape of cup shown, as a cup reaches the top of the pulley the upper part of the contents will be ejected, the outer wall 16 giving the proper direction of the contents toward the outlet 11, as indicated by the arrows *x*. As the bucket continues the lower part of the contents will be ejected and the angle of the wall section 17 is such that the material will also be directed toward the outlet 11, as indicated by the arrows *y*. With the cup construction shown the grain or other material is given a double push and it is all positively directed toward the outlet 11. This being the case, the pitch or the distance between buckets can be greatly decreased and the diameter of the pulleys can be greatly reduced and the speed considerably increased with corresponding increase in conveying capacity and efficiency. In prior structures where the bucket bottom is all in one straight plane, the buckets must be a considerable distance apart on a pulley of comparatively large diameter and the speed of the pulley must be limited, otherwise the cup contents will not be accurately discharged but a great part thereof will be thrown from one bucket against the preceding bucket and down the return leg of the housing. As illustrative of the utility and efficiency of my construction I have found that the speed can easily be three times as great as that permissible with the ordinary type of cups and the pitch can be made at least 120% less than that necessary with other types of cups. For example, I have demonstrated that with an eight-inch diameter pulley running at four hundred revolutions per minute and the cups only six inches apart, the contents are completely and accurately discharged, where other cups would not permit a speed exceeding one hundred revolutions per minute with a distance between cups of not less than fourteen inches.

It is evident that instead of having the cup bottom formed of two wall sections at different angles with the cup back more sections could be provided, each section giving the proper direction of the contents during a certain distance of travel of the cup along the discharging arc. Other changes may also be made without departing from the spirit of the invention.

I claim as follows:

1. An elevator cup comprising side walls and a back wall whereby it may be secured to a conveyer belt, and a bottom wall composed of inner and outer sections, the inner section being at an obtuse angle with said back wall and the outer section being at an acute angle with said back wall.

2. In an elevator, the combination with an upper pulley, a belt engaging said pulley, cups comprising side walls and a back wall and secured with their back walls against said belt, each cup having a bottom wall composed of sections in planes at different angles with said back wall whereby during travel of a bucket through the discharging arc of the pulley the contents will be successively directed in a common direction by said bottom wall sections.

3. In an elevator, the combination of a housing having an outlet at its upper end, pulleys in said housing and a belt thereon, cups each comprising a back wall and side walls and secured with their back walls to the belt, each cup having a bottom composed of wall sections, said wall sections being each at such angle with reference to the cup back that as a cup travels along the discharging arc with the belt the cup contents will be successively engaged by said wall sections and deflected toward said outlet.

In witness whereof, I hereunto subscribe my name this 16th day of October, A. D., 1918.

JULIUS A. GERWEN.